United States Patent [19]

Itoh et al.

[11] 4,084,656
[45] Apr. 18, 1978

[54] MOTORCYCLE STAND WITH SAFETY SWITCH

[75] Inventors: Masaki Itoh, Akashi; Yorio Yamasaki, Kakogawa, both of Japan

[73] Assignee: Kawasaki Jukogyo Kabushiki Kaisha, Japan

[21] Appl. No.: 789,679

[22] Filed: Apr. 21, 1977

[30] Foreign Application Priority Data

May 1, 1976   Japan .................................. 51-50508

[51] Int. Cl.² ............................................ B60K 28/00
[52] U.S. Cl. ................................ 180/103 R; 280/293; 280/301
[58] Field of Search .................... 180/82 R, 103 R; 280/293, 301

[56] References Cited

U.S. PATENT DOCUMENTS

| 3,908,780 | 9/1975 | McClure | 280/293 |
|---|---|---|---|
| 3,918,743 | 11/1975 | Sato | 280/301 |
| 4,010,379 | 3/1977 | Shimamoto | 280/293 |
| 4,016,538 | 4/1977 | Miller | 280/293 |

Primary Examiner—Joseph F. Peters, Jr.
Assistant Examiner—Donn McGiehan
Attorney, Agent, or Firm—McGlew and Tuttle

[57] ABSTRACT

The device prevents starting of the engine of a two-wheeled motorcycle even if the two-wheeled motorcycle is brought to an upright position and an attempt is made to start the engine, unless the stand is in an inoperative position. A stand switch is opened by the stand when the latter is in a neutral position so that the ignition circuit for the engine cannot be rendered operative, thereby to prevent actuation of the engine. When the stand is in either the inoperative position or the operative position, the stand switch is closed to permit the engine to be started. A normally open manually-operated switch shunts the stand switch and is capable of operating the ignition circuit regardless of whether the stand switch is closed or open.

14 Claims, 8 Drawing Figures

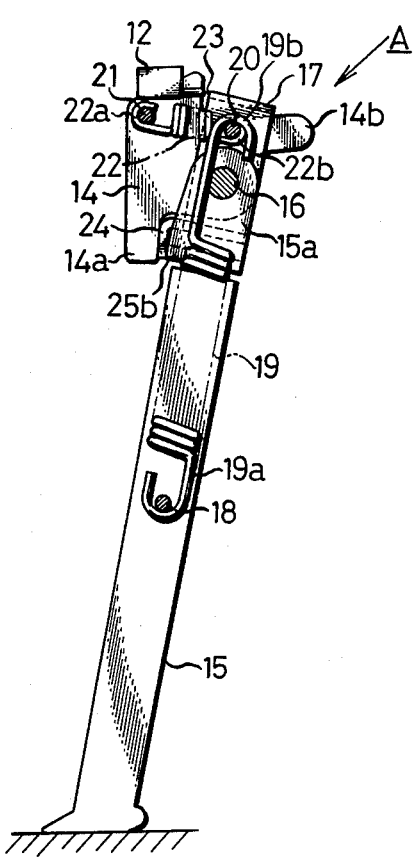
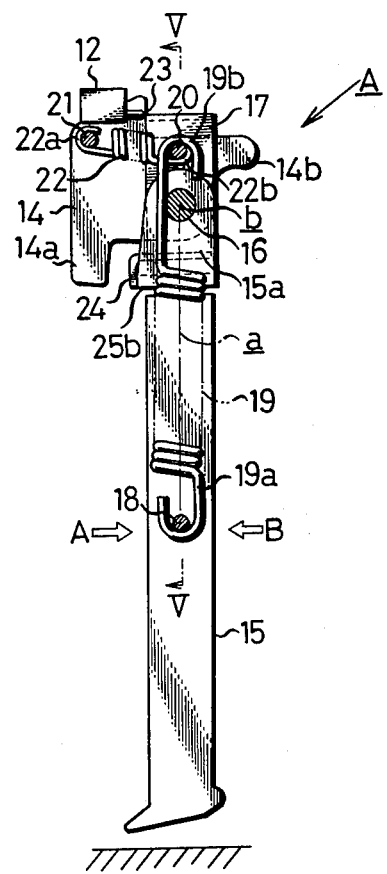

MOTORCYCLE STAND WITH SAFETY SWITCH

BACKGROUND OF THE INVENTION

This invention relates to a device for preventing the starting of a two-wheeled motorcycle without its stand being brought to an inoperative position, so that there can be avoided an accident which might otherwise occur when the motorcycle runs with its stand projecting sideways therefrom.

Generally, in this type of motorcycle, the stand device includes a stand pivotally supported by a bracket secured to the motorcycle body frame and urged by the biasing force of a spring to move to the forwardly inclined operative position so as to positively support the motocycle, which remains stationary. If the driver forgets to move the stand to its inoperative position and starts the engine while the stand in its neutral position projects sideways from the motorcycle, the front end of the stand may strike the ground or some object on the ground while the motorcycle is running. The reaction of a shock of collision of the stand against the ground or some object on the ground may cause an unexpected hazard to the driver because the motorcycle may overturn.

In one type of two-wheeled motorcycle, there is provided a stand device including a stand adapted to be brought to a forwardly inclined operative position to support the body of the motorcycle when the latter is stationary, to be automatically brought to a neutral position when the forward end of the stand is released from contact with the ground and to be brought from the neutral position to an inoperative position by the driver (U.S. Patent Application Ser. No. 705,253).

SUMMARY OF THE INVENTION

Accordingly, an object of the present invention is to provide a novel device for preventing the starting of a two-wheeled motorcycle of the type described without the stand being brought to an inoperative position, such device comprising a stand switch which is adapted to be operated in association with the stand device in such a manner that the ignition circuit for the engine can be rendered operative when the stand is in its forwardly inclined operative position and in its inoperative position, and can not be rendered operative when the stand is in its neutral position, so as to make it impossible to ignite a fuel-air mixture for starting the engine when an attempt is made to bring the motorcycle to an upright position and start the engine without bringing the stand to its inoperative position, whereby the safety of motorcycle driving can be increased by eliminating the aforesaid accident.

Another object is to provide a device for preventing the starting of a two-wheeled motorcycle of the type described without the stand being brought to an inoperative position, wherein the stand switch is effective not only to render inoperative the ignition circuit for the engine but also to prevent the actuation of the starter motor even if the starter motor operating switch of the engine starting circuit connected to the ignition circuit for the engine is turned on, whereby consumption of the electrical charge stored in the battery can be prevented.

Still another object is to provide a device for preventing the starting of a two-wheeled motorcycle of the type described without the stand being brought to an inoperative position, such device further comprising a manually operated switch mounted in association with the stand switch so as to be able to operate the ignition circuit for the engine regardless of whether the stand switch is on or off, so that even if the driver brings the motorcycle to its upright position with the stand being disposed in its neutral position, it is possible to continue the operation of the engine by actuating the manually operated switch, without causing the ignition circuit for the engine (and the engine starting circuit) to be rendered inoperative.

BRIEF DESCRIPTION OF THE DRAWINGS

FIG. 2 is a side view of the stand device with which the stand switch according to the invention operates in association, with the stand device being shown in its forwardly inclined operative position in which it supports the stationary or parked motorcycle;

FIG. 3 is a side view of the stand device of FIG. 2, with the stand device being shown in its neutral position in which it projects sideways from the motorcycle which has been brought to an upright position;

DESCRIPTION OF THE PREFERRED EMBODIMENTS

Figure 1:
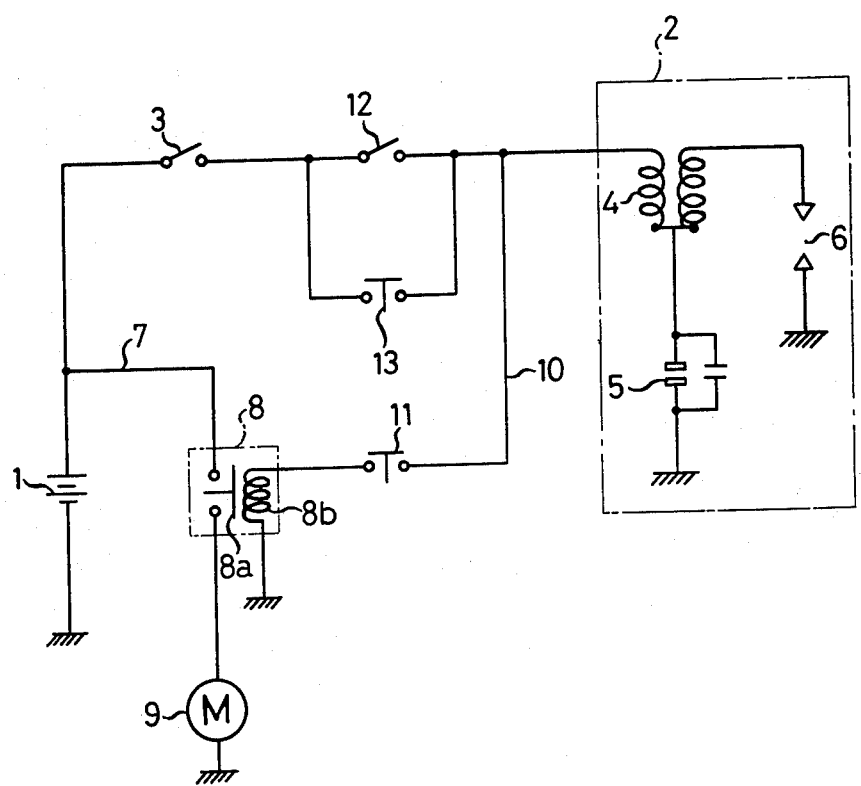
FIG. 1 is an electric circuit diagram of one embodiment of the invention.

In FIG. 1, the numeral 1 designates a battery, and the numeral 2 refers to an ignition circuit for the engine connected to the battery 1 through a main switch 3 and comprising an ignition coil 4, a contact breaker 5 and an ignition plug 6. The numeral 7 designates a starter motor circuit connected to the battery 1 in parallel with the ignition circuit 2 and consisting of a relay contact 8a, of an electromagnetic relay 8, and an engine starter motor 9, connected in series with each other. The numeral 10 designates an engine starting circuit shunted from the battery side of the ignition circuit 2 in parallel with the ignition circuit 2 and motor circuit 7 and consisting of a relay coil 8b, of the electromagnetic relay 8, and a starter motor operating switch 11, connected in series with each other. The main switch 3 and a stand switch 12 are connected to the battery side of the ignition circuit 2 and the battery side of the engine starting circuit 10 in series with each other.

The stand switch 12 operates in association with a stand device A including a stand (See FIGS. 2 to 5 and 6) which is adapted to be brought to a forwardly inclined operative position to support the motorcycle when the latter is stationary, to a neutral position in which it projects sideways from the motocycle when the latter is brought to an upright position, and to an inoperative position by the driver. More specifically, the stand switch 12 is adapted to be closed when the stand is in its operative position, opened when the stand is in its neutral position and closed when the stand is in its inoperative position. Additionally, a normally open manually operated switch 13, which may be a switch of the pushbuttom type, for example, is connected in parallel with the stand switch 12 and can be closed, when manually operated by the driver, to shut the stand switch 12.

One example of the stand device A and the stand switch 12 adapted to operate in conjunction therewith will now be described with reference to FIGS. 2 to 5.

A body frame (not shown) of the motorcycle has secured thereto a bracket 14, and a shaft 16 extending through the bracket 14 pivotally supports the stand 15 at an upper end portion 15a thereof. The upper end portion 15a of the stand 15 is in the form of a letter U, and the bracket 14 includes a projecting portion 14b which extends between vertical legs 25a of the U-shaped upper portion 15a of the stand 15. A pivotal member 17, which is hollow and rectangular in cross-section, is positioned between the two vertical legs 25a of the U-shaped upper portion 15a of the stand 15 and supported by the shaft 16 for pivotal movement independently of the stand 15. The projecting portion 14b of the bracket 14 extends through the hollow interior of the pivotal member 17.

The pivotal member 17 has attached to its lower end a tongue 24 which extends downwardly from the pivotal member 17 along a base 14a of the bracket 14 in such a manner that its forward end can be brought into engagement with a web 25b of the U-shaped upper portion 15a of the stand 15. The tongue 24 performs the function of moving the stand 15 from its operative position shown in FIG. 2, in which it is tilting forwardly, to its neutral position shown in FIG. 3 as the tongue 24 shifts its position as a result of the pivotal movement of the pivotal member 17.

The pivotal member 17 can pivotally move about the shaft 16 between a position in which an upper side surface 23 of the member 17 abuts against the base 14a of the bracket 14 as shown in FIG. 3 and a position in which the tongue 24 abuts against the base 14a of the bracket 14 as shown in FIG. 2.

The numeral 19 designates a main spring supported at one end portion 19a by a pin 18 attached to the intermediate portion of the stand 15 and at the other end portion 19b by a pin 20 attached to an upper portion of the pivotal member 17. The numeral 22 designates an auxiliary spring supported at one end portion 22a by a pin 21 attached to the base 14a of the bracket 14 and at the other end portion 22b by the pin 20 attached to the pivotal member 17. The position of the pin 20 attached to the pivotal member 17 is set such that, when the stand 15 is in its neutral position and the upper side surface 23 of the pivotal member 17 is maintained in abutting engagement with the base 14a of the bracket 14 as shown in FIG. 3, a line a connecting together the pin 18, the center axis b of the shaft 16 and the pin 20 is straight. In FIG. 3, the auxiliary spring 22 is shown as urging, by its biasing force, the pivotal member 17 in a direction which is normal to the main spring 19 when the stand 15 is in its neutral position. However, the present invention is not limited to this arrangement, and the auxiliary spring 22 may be mounted in any manner as desired, so long as it urges the pivotal member 17 to move counterclockwise about the shaft 16 in FIG. 3.

Figure 4:
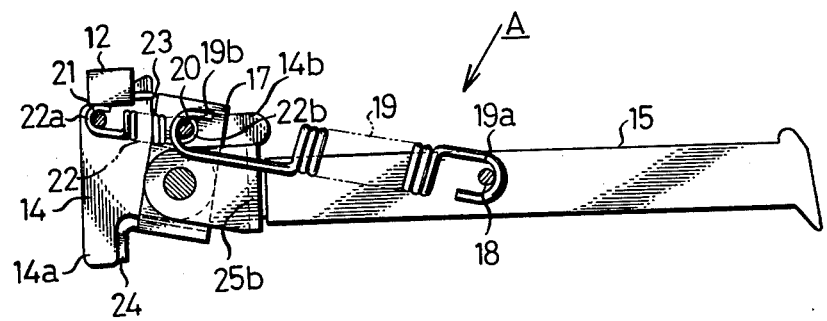
FIG. 4 is a side view of the stand device of FIG. 2, with the stand device being shown in its inoperative position.
Figure 5:
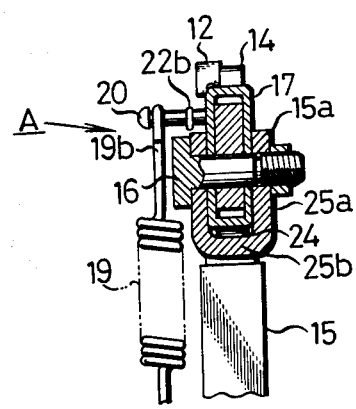
FIG. 5 is a sectional view taken along the line V—V of FIG. 3.
Figure 6:
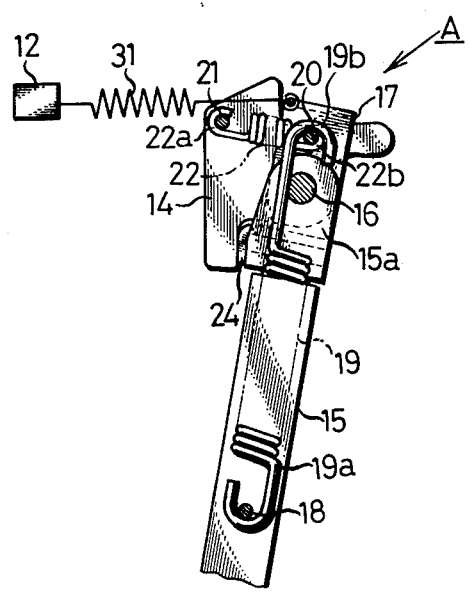
FIG. 6 is a side view of the essential portions of the stand device, shown together with a modified form of the stand switch according to the invention.

The web portion 25b of the upper portion 15a of the stand 15 is adapted to be brought into abutting engagement with the tongue 24 extending from the lower end of the pivotal member 17. Thus, the forward movement of the stand 15 along the longitudinal axis of the motorcycle is restricted by the abutting engagement of the tongue 24 with the base 14a of the bracket 14 as shown in FIG. 2. Since the pivotal member 17 moves together with the stand 15 as a unit as the stand 15 shifts to its operative position, the line connecting together the pins 18, 20 and the center axis b remains straight. Thus, the stand 15 disposed in its operative position automatically moves to the neutral position shown in FIG. 3, because, when the weight applied to the motorcycle stand is removed, the pivotal member 17 is moved counterclockwise from its operative position in FIG. 2 by the biasing force of the auxiliary spring 22. The rearward movement of the stand 15 along the longitudinal axis of the motorcycle is restricted by the abutting engagement of the web portion 25b of the upper end portion 15a of the stand 15 with the projection 14b of the bracket 14 as shown in FIG. 4.

Mounted in the upper portion of the bracket of the stand device A constructed as aforesaid is the stand switch 12 (See FIG. 1) which is arranged in a position in which its operator can be brought into abutting engagement with the upper side portion 23 of the pivotal member 17. The stand switch 12 is opened when its operator abuts against the upper side portion 23.

When the stand device is in its operative position, the stand 15 is urged to move in the direction of an arrow B (in FIG. 3) into a forwardly inclined position shown in FIG. 2. If the load of the body of the motorcycle is applied to the stand at this time, the stand 15 will overcome the biasing force of the auxiliary spring 22 and be maintained in the indicated position (FIG. 2) in which the tongue 24 of the pivotal member 17 abuts against the base 14a of the bracket 14. Thus the body of the motorcycle is positively supported by the stand 15 and at the same time the upper side portion 23 of the pivotal member 17 is kept from being brought into abutting engagement with the operator of stand switch 12, thereby turning on the stand switch 12.

If the body of the motorcycle is brought to an upright position and the load applied to the stand 15 is removed, the pivotal member 17 will be urged to move counterclockwise in pivotal motion about the shaft 16 by the biasing force of the auxiliary spring 22 as shown in FIG. 3. As a result, the upper side portion 23 of the pivotal member 17 is brought into abutting engagement with the bracket 14 and the operator of stand switch 12, thereby opening the stand switch 12. When the pivotal member 17 moves in pivotal motion as aforesaid, the tongue 24 of the pivotal member 17 moves rightwardly and causes the web 25b of the stand 15 to move with it, so that the stand 15 is moved to its neutral position shown in FIG. 3.

If the stand 15 in its neutral position is urged to move in the direction of an arrow A in FIG. 3, the line a connecting the two pins 18 and 20 to which the main spring 19 is connected at opposite ends thereof will be displaced rightwardly of the center b of the shaft 16 for the stand 15. This rightward displacement will cause the main spring 19 to be contracted such that the spacing between the pins 18 and 20 is reduced, so that the stand 15 will move counterclockwise in pivotal motion about the shaft 16 to its inoperative position shown in FIG. 4. At this time, the biasing force of the main spring 19 overcomes the biasing force of the auxiliary spring 22 and causes the pivotal member 17 to move clockwise in pivotal motion about the shaft 16. This results in the tongue 24 abutting against the base 14a of the bracket 14 so as thereby to hold the stand 15 in its inoperative position and at the same time to release the operator of stand switch 12 from abutting engagement with the upper side portion 23 of the pivotal member 17, thereby closing the stand switch 12.

If the body of the stationary motorcycle is inclined toward the stand 15 which is in its neutral position to park the motorcycle, the lower end of the stand 15 will be brought into contact with the ground and the weight of the motorcycle will gradually be brought to bear upon the stand 15. The reaction directed from the ground to the stand 15 against the weight of the motorcycle acts slightly forwardly of the shaft 16, so that the reaction overcomes the biasing force of the auxiliary spring 22 and causes the stand 15 to move clockwise in pivotal motion about the sahft 16 to its forwardly inclined operative position. If the motorcycle is brought to an upright position, the lower end of the stand 15 will be released from contact with the ground and the stand 15 will be automatically moved by the biasing force of the auxiliary spring 22 to its neutral position. Since the center line of the main spring 19 passes through the shaft 16, no force is exerted on the stand 15 in a manner to urge the same to move in pivotal motion.

In the embodiment described above, the operator of stand switch 12 is adapted to be brought into direct abutting engagement with the pivotal member 17 of the stand device A. However, in another embodiment shown in FIG. 6, a spring 31 may be mounted between the stand switch 12 and the pivotal member 17, so that the stand switch 12 will be actuated by being moved forwardly or rearwardly by the biasing force of spring 31. Any other indirect connecting mechanism that will come to the mind of one of ordinary skill in the art may be used for connecting the stand spring 12 to the pivotal member 17.

In the aforesaid stand device A, the pivotal member 17 is disposed in the same position when the stand 15 is in its forwardly inclined operative position and in its inoperative position, although the stand 15 moves in three stages to and from three different positions. Thus, the pivotal member 17 merely operates in two stages. Therefore, the stand switch 12 which is operative in response to the movement of the pivotal member 17 may be in the form of an on-off switch. This eliminates the need to use a switch of the three-stage change-over type as the stand switch 12, thereby contributing to reduction of cost and simplification of circuit wiring.

Operation of the embodiment shown in FIG. 1 will now be described. When the motorcycle is stationary (parked) or when the stand 15 is in its forwardly inclined operative position, the stand switch 12 is open. Therefore, if the main switch 3 is closed the ignition circuit 2 can be operated, thereby permitting ignition of a fuel-air mixture for starting the engine. Moreover, by closing the starter motor operating switch 11, it is possible to actuate the starter motor 9 in a manner to start the engine, because the engine starting circuit 10 operates in a manner to close the relay contact 8a of the electromagnetic relay 8.

Next, if the driver moves the motorcycle to an upright position without actuating the manually-operated switch 13 to start the motorcycle while the engine is operating with the stand in its operative position, the stand 15 will automatically move to its neutral position and will be held in this position, so that the stand switch 12 will be opened. As a result, ignition circuit 2 will be rendered inoperative and the engine stops operating. At this time, it is impossible, of course, to actuate the starter motor 9 by operating the starter motor operating switch 11. If, at this time, the manually-operated switch 13 is operated and closed, it is possible to keep the engine operating because the ignition circuit 2 is maintained connected to the battery. If the stand 15 is brought to its inoperative position while the manually-operated switch 13 is being operated, the stand switch 12 will be closed. Thus, the engine continues its operation even if the manually-operated switch 13 is released. Thus, if the operation of the manually-operated switch 13 is continued, it is possible to ignite a fuel-air mixture for starting the engine and to start the engine regardless of whether the stand switch 12 is closed or open or regardless of the position of the stand 15. The series of operations are summarized in Table 1.

Table 1

| Position of Stand | Main Switch | Stand Switch | Manual Switch | Ignition | Starter Motor Oper. Switch | Starting of Starter Motor |
|---|---|---|---|---|---|---|
| operative | ON | ON | OFF | possible | ON | possible |
|  |  |  | ON |  | OFF | impossible |
|  |  |  |  |  | ON | impossible |
|  |  |  | OFF | impossible | OFF | impossible |
| neutral | ON | OFF |  |  | ON | possible |
|  |  |  | ON | possible | OFF | impossible |
|  |  |  | OFF |  | ON | possible |
| inoperative | ON | ON |  | possible |  |  |
|  |  |  | ON |  | OFF | impossible |

Figure 7:
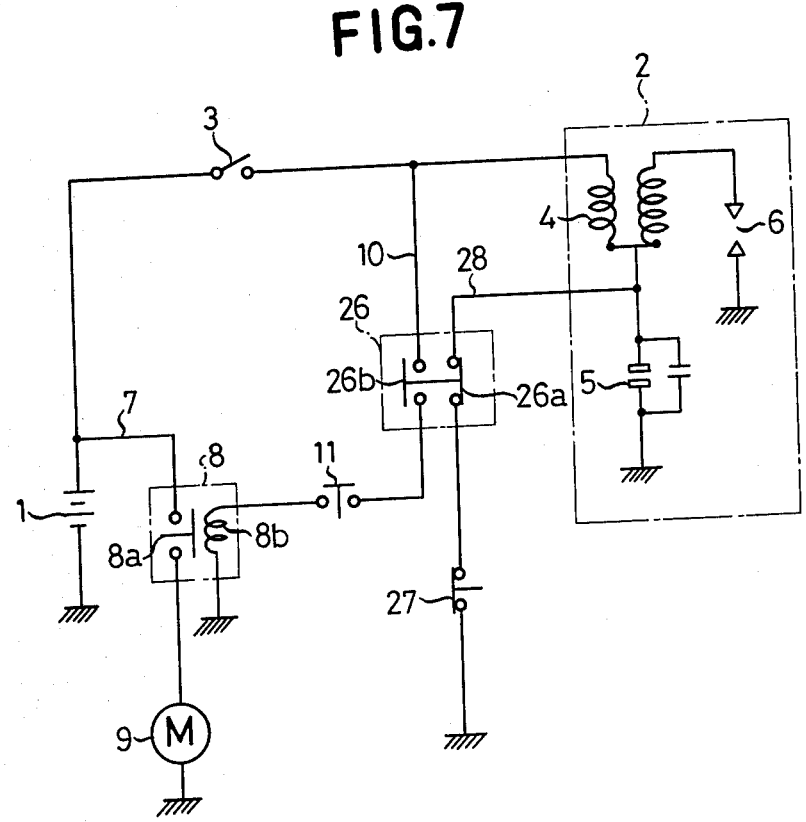
FIG. 7 is an electric circuit diagram of another embodiment of the invention.

In the embodiment shown in FIG. 7, the stand switch 26 includes a first contact 26a and a second contact 26b, and a ground circuit 28 consisting of the first contact 26a and the manually-operated switch 27 connected in series to each other, is connected in parallel with the contact breaker 5 of the ignition circuit 2 for the engine. The second contact 26b is connected in series with the engine starting circuit 10. Like the stand switch 12, the stand switch 26 is mounted to operate in association with the stand device A as shown in FIGS. 2 to 5 and 6. In this embodiment, the first contact 26a of the stand switch 26 operates in association with the stand device A. That is, the first contact 26a opens when the stand 15 is in its operative position (FIG. 2), closes when the stand 15 is in its neutral position (FIG. 3) and opens when the stand is in its inoperative position (FIG. 4). The second contact 26b of the stand switch 26 operates in a manner opposite to the operation of the first contact 26a. The manually-operated switch 27 is adapted to be opened and closed manually, and may be of a pushbutton type which is closed when it is not operated and opened when it is operated. Other elements are similar to those shown and described with reference to the embodiment shown in FIG. 1 and like reference characters designate similar parts. The series of operations of the embodiment are summarized in Table 2.

Table 2

| Position of Stand | Main Switch | First Contact of Stand Switch | Manual Switch | Ignition | Starter Motor Oper. Switch | Starting of Starter Motor |
|---|---|---|---|---|---|---|
| operative | ON | open | ON | possible | ON | possible |
|  |  |  | OFF |  | OFF | impossible |
|  |  |  |  |  | ON | impossible |
|  |  |  | ON | impossible |  |  |
|  |  |  |  |  | OFF | impossible |
| neutral | ON | close |  |  | ON | impossible |
|  |  |  | OFF | possible |  |  |
|  |  |  |  |  | OFF | impossible |
| inoperative | ON | open | ON | possible | ON | possible |
|  |  |  | OFF |  | OFF | impossible |

Figure 8:
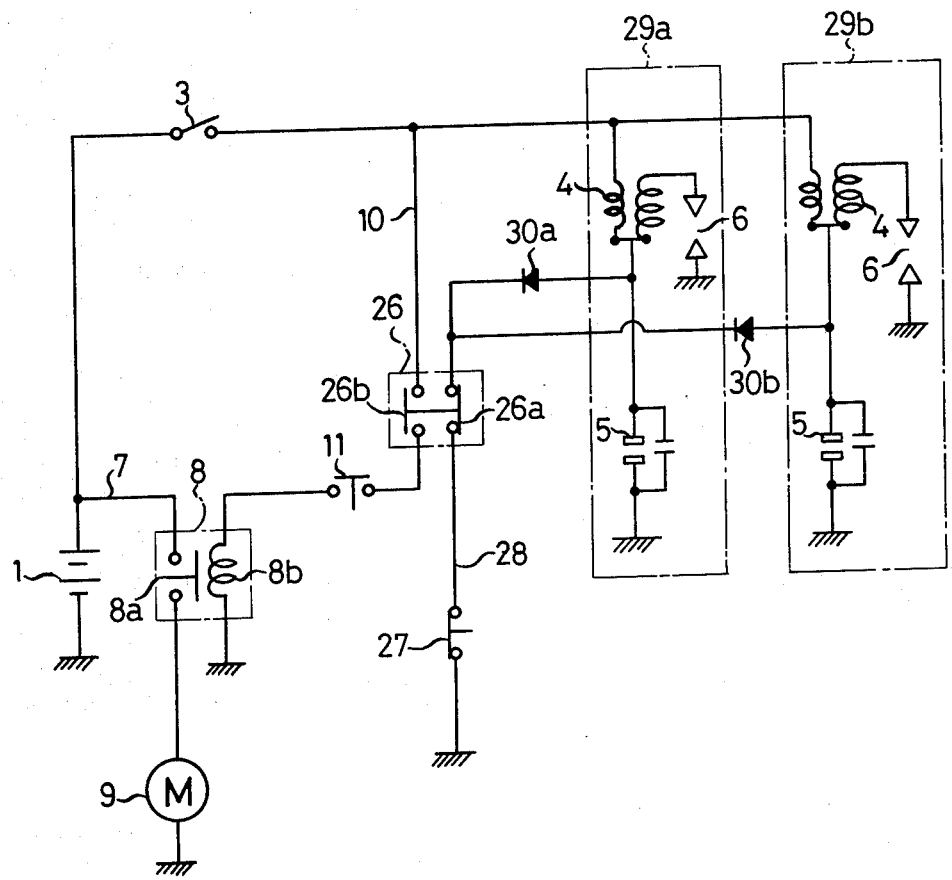
FIG. 8 is an electric circuit diagram of still another embodiment of the invention.

The embodiment shown in FIG. 8 differs from that shown in FIG. 7 in that the ignition system for the engine of the former consists of two ignition circuits 29a and 29b as contrasted to one ignition circuit 2 of the latter. The ground circuit 28 is connected to the ignition circuits 29a and 29b through diodes 30a and 30b respectively for preventing the flow of current in a reverse direction. Other elements of the embodiment shown in FIG. 8 are similar to those shown in FIG. 7, and like reference characters designate similar parts in the two figures.

From the foregoing description, it will be appreciated that the present invention offers the following advantages. First, the invention makes it impossible to ignite a fuel-air mixture for starting the engine if the driver attempts to bring the motorcycle to its upright position and start it without moving the stand to its inoperative position. Thus the driver cannot start the motorcycle without moving the stand to its inoperative position, thereby preventing an accident which would otherwise occur due to the projecting stand striking the ground or some object on the ground. At the same time, even if the stand projects from the motorcycle, it is possible to ignite a fuel-air mixture for starting the engine so long as the stand is in its operative position in which the motorcycle is supported by the stand. This permits engine warm-up or inspection of the condition of engine to be performed readily.

Secondly, when the ignition circuit for the engine is connected to an engine starting circuit having a starter motor operating switch, the invention makes it impossible to actuate the starter motor even if the starter motor operating switch is turned on, in addition to making it impossible to ignite a fuel-air mixture for the engine when the stand is in its neutral position. This is conducive to reduced consumption of the electrical charge stored in the battery.

Additionally, the provision of the manually-operated switch, which cancels out the operation of the stand switch, keeps the ignition circuit for the engine and the engine starting circuit from becoming inoperative and makes it possible to continuously operate the engine by operating the manually-operated switch from the time the motorcycle remains stationary (parked) until the time it is brought to its upright position and the stand is moved to its inoperative position, even if the motorcycle is brought to its upright position with the stand sticking out therefrom. Moreover, since the manually-operated switch is one which is actuated when operated manually or of the pushbutton type, for example, which operates only when it is depressed, the act of operating the manually-operated switch is a reminder to the driver that the stand is not in its inoperative position but projects from the motorcycle. Thus, the manually operated switch not only does not interfere with the function of preventing the starting of the motorcycle without moving the stand to its inoperative position but also is effective in preventing an accident.

What we claim is:

1. A device for preventing the starting of a two-wheeled motorcycle having a source of potential, an engine ignition circuit, an engine starting circuit and a stand, for motorcycles of the type comprising a stand assembly including a stand adapted to be brought to a forwardly inclined operative position for supporting the motorcycle when the latter is stationary, to automatically move to a neutral position when the motorcycle is brought to an upright position and to be moved to an inoperative position by the driver when the motorcycle runs, said device comprising, in combination, a stand switch connected in series between said ignition circuit and said source of potential; and means included in said stand assembly and operable to effect closure of said stand switch, when said stand is in either its operative position or its inoperative position, and to effect opening of said stand switch when said stand is in its neutral position.

2. A device as claimed in claim 1, in which said engine starting circuit has a starter motor energizing switch; said stand switch being connected between said starter motor energizing switch and said source of potential.

3. A device as claimed in claim 1, wherein said stand device comprises: a stand pivotally supported by a bracket attached to a body frame of the motorcycle; a pivotal member capable of pivoting about a point at which said stand is pivoted, said pivotal member pivoting independently of said stand and having a portion which moves said stand from its operative position to its neutral position; a main spring mounted between an upper portion of said pivotal member and said stand; and an auxiliary spring mounted between the upper portion of said pivotal member and the bracket and adapted to bias the pivotal member to act to restore the stand from its operative position to its neutral position.

4. A device as claimed in claim 3, wherein the position at which the upper end of said main spring is supported is set such that, when said pivotal member is biased by the auxiliary spring to be disposed at one limit of the range of its pivotal movement, the point at which said stand is pivoted is disposed on a straight line connecting the two positions at which both ends of the main spring are supported and the stand is brought to its neutral position.

5. A device as claimed in claim 3, wherein said stand includes an upper end portion in the form of a letter U and said pivotal member is disposed between two vertical legs of said U-shaped upper portion, and wherein said portion of said pivotal member adapted to move said stand from its operative position to its neutral position comprises a tongue extending downwardly from the lower end of the pivotal member along the front of the web portion of the U-shaped upper portion of the stand with respect to the longitudinal axis of the motorcycle.

6. A device as claimed in claim 5, wherein said tongue also performs the function of a stopper for setting one limit of the range of pivotal movement of said pivotal member.

7. A device as claimed in claim 3, wherein said bracket also performs the function of a stopper for limiting the pivotal movement of said stand.

8. A device for preventing the starting of a two-wheeled motorcycle having a source of potential, an engine ignition circuit, an engine starting circuit and a stand for motorcycles of the type comprising a stand assembly including a stand adapted to be brought to a forwardly inclined operative position for supporting the motorcycle when the latter is stationary, to automatically move to a neutral position when the motorcycle is brought to an upright position and to be moved to an inoperative position by the driver when the motorcycle runs, said device comprising, in combination, a stand switch connected in series between said ignition circuit and said source of potential; means included in said stand assembly and operable to effect closure of said stand switch, when said stand is in either its operative position or its inoperative position, and to effect opening of said stand switch when said stand is in its neutral position; and a normally open manually operable switch connected in shunt with said stand switch and operable, when closed, to cancel the effects of operation of said stand switch.

9. A device as claimed in claim 8, in which said engine starting circuit has a starter motor energizing switch; said stand switch being connected between said starter motor switch and said source of potential.

10. A device as claimed in claim 8, wherein said stand device comprises; a stand pivotally supported by a bracket attached to a body frame of the motorcycle; a pivotal member capable of pivoting about a point at which said stand is pivoted, said pivotal member pivoting independently of said stand and having a portion which moves said stand from its operative position to its neutral position; a main spring mounted between an upper portion of said pivotal member and said stand; and an auxiliary spring mounted between the upper portion of said pivotal member and the bracjet and adapted to bias the pivotal member to act to restore the stand from its operative position to its neutral position.

11. A device as claimed in claim 8, wherein the position at which the upper end of said main spring is supported is set such that, when said pivotal member is biased by the auxiliary spring to be disposed at one limit of the range of its pivotal movement, the point at which said stand is pivoted is disposed on a straight line connecting the two positions at which both ends of the main spring are supported and the stand is brought to its neutral position.

12. A device as claimed in claim 8, wherein said stand includes an upper end portion in the form of a letter U and said pivotal member is disposed between two vertical legs of said U-shaped upper portion, and wherein said portion of said pivotal member adapted to move said stand from its operative position to its neutral position comprises a tongue extending downwardly from the lower end of the pivotal member along the front of the web portion of the U-shaped upper portion of the stand with respect to the longitudinal axis of the motorcycle.

13. A device as claimed in claim 12, wherein said tongue also performs the function of a stopper for setting one limit of the range of pivotal movement of said pivotal member.

14. A device as claimed in claim 8, wherein said bracket also performs the function of a stopper for limiting the pivotal movement of said stand.

* * * * *